United States Patent
Chen

(10) Patent No.: US 10,353,236 B2
(45) Date of Patent: Jul. 16, 2019

(54) COLOR FILM SUBSTRATE AND LIQUID CRYSTAL PANEL

(71) Applicant: Shenzhen China Star Optoelectronics Technology Co., Ltd., Shenzhen, Guangdong (CN)

(72) Inventor: Shuai Chen, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 41 days.

(21) Appl. No.: 15/740,629

(22) PCT Filed: Jul. 14, 2017

(86) PCT No.: PCT/CN2017/093020
§ 371 (c)(1),
(2) Date: Dec. 28, 2017

(87) PCT Pub. No.: WO2019/000499
PCT Pub. Date: Jan. 3, 2019

(65) Prior Publication Data
US 2018/0373087 A1  Dec. 27, 2018

(30) Foreign Application Priority Data
Jun. 27, 2017 (CN) .......................... 2017 1 0501731

(51) Int. Cl.
*G09G 3/36* (2006.01)
*G02F 1/1335* (2006.01)
(Continued)

(52) U.S. Cl.
CPC ...... *G02F 1/133514* (2013.01); *G02F 1/1343* (2013.01); *G02F 1/136286* (2013.01);
(Continued)

(58) Field of Classification Search
CPC ... G02F 1/133514; G02F 2001/136222; G02F 2201/52; G02F 1/1343;
(Continued)

(56) References Cited

U.S. PATENT DOCUMENTS

2005/0001808 A1* 1/2005 Lee ...................... G09G 3/3655
345/96
2009/0102991 A1* 4/2009 Chen .................... G09G 3/3614
349/33
(Continued)

*Primary Examiner* — Jia X Pan
(74) *Attorney, Agent, or Firm* — Mintz Levin Cohn Ferris Glovsky and Popeo, P.C.; Kongsik Kim

(57) ABSTRACT

A color film substrate includes: a plurality of first color filters, a plurality of second color filters, a plurality of first common electrode sheets and a plurality of second common electrode sheets; the plurality of first color filters and the plurality of second color filters are arranged in an array, and the plurality of first common electrode sheets and the plurality of second common electrode sheets are arranged in an array, the first color filter is in one-to-one correspondence with the first common electrode sheet, and the second color filter is in one-to-one correspondence with the second common electrode sheet; and pixels corresponding to the first color filter and the second color filter serve to store pixel voltages having opposite polarities, respectively, and the first common electrode sheet serves to transmit a direct-current common voltage, and the second common electrode sheet serves to transmit a square-wave common voltage.

13 Claims, 2 Drawing Sheets

(51) Int. Cl.
*G02F 1/1343* (2006.01)
*G02F 1/1362* (2006.01)

(52) U.S. Cl.
CPC ......... *G09G 3/3614* (2013.01); *G09G 3/3655* (2013.01); *G02F 2001/134318* (2013.01)

(58) Field of Classification Search
CPC .. G02F 2001/134318; G02F 1/136286; G09G 3/2003; G09G 2300/0452; G09G 2300/0443; G09G 3/3607; G09G 3/3611; G09G 5/02; G09G 3/3614; G09G 3/3655; G02B 5/201; H01L 27/322; H01L 27/3213; H01L 27/3218; H01L 27/3211
See application file for complete search history.

(56) References Cited

U.S. PATENT DOCUMENTS

| | | | |
|---|---|---|---|
| 2009/0262061 A1* | 10/2009 | Chung | G02F 1/134363 345/100 |
| 2011/0128272 A1* | 6/2011 | Chen | G09G 3/3614 345/211 |
| 2012/0206436 A1* | 8/2012 | Nakata | G02F 1/134309 345/212 |

* cited by examiner

COLOR FILM SUBSTRATE AND LIQUID CRYSTAL PANEL

CROSS-REFERENCES TO RELATED APPLICATIONS

This application is a U.S. national phase application, pursuant to 35 U.S.C. § 371, of PCT/CN2017/093020, filed Jul. 14, 2017, designating the United States, which claims priority to Chinese Application No. 201710501731.8 filed Jun. 27, 2017. The entire contents of the aforementioned patent applications are incorporated herein by this reference.

TECHNICAL FIELD

The present disclosure relates to a technical field of a liquid crystal display, and specifically, relates to a color film substrate and a liquid crystal panel.

BACKGROUND ART

With the development of photoelectric and semiconductor technology, it also promotes the rapid development of Flat Panel Display. In various flat panel displays, Liquid Crystal Display (LCD for short) has been applied to all aspects of production and life since it has many advantages, such as high space utilization efficiency, low power consumption, zero radiation and low electromagnetic interference.

A liquid crystal display generally includes a liquid crystal panel and a backlight module disposed opposite to each other, but the liquid crystal panel cannot emit light, thus the backlight module is needed to provide uniform display light to the liquid crystal panel so that the liquid crystal display displays an image. At present, common display modes of the liquid crystal panel mainly include TN (twisted nematic) mode, VA (vertical alignment) mode, and IPS (In-Plane Switching) mode etc.

The VA display mode refers to a display mode that liquid crystal molecules are vertically aligned with a substrate. The liquid crystal panel in the VA display mode has advantages of displaying images with high contrast and high penetration rate, but a viewing angle is poor. To improve the viewing angle, in the liquid crystal panel of VA display mode, a long axis of the liquid crystal molecular in a pixel is perpendicular to a filter in an uncharged state, each pixel is divided into a plurality of domains (multi-domain), and in a charged state, the liquid crystal molecules in each domain deflect to respective directions, with this method, a liquid crystal molecular orientation in the same pixel has various directions, so as to compensate respective angles of view, and then realize a uniform display when viewing from respective angles, thus can effectively improve viewing angle characteristics under grayscale display status from different observation angles.

Eight domain dividing is a commonly used method of dividing a pixel domain, while in a 8-domain pixel, a large amount of thin film transistors and the corresponding capacitances are used, thus an aperture ratio of the pixel may be seriously influenced, and in driving of the 8-domain pixel structure, in order to compensate color shift of large viewing angle, brightness of some domains is lowered, these would causes a reduction in penetration rate of the liquid crystal panel.

SUMMARY

In order to solve the above problem in the prior art, an object of the present disclosure is to provide a color film substrate and a liquid crystal panel to realize color shift compensation of large viewing angle display on the premise of the existence of a 4-domain pixel structure.

According to an aspect of the present disclosure, there is provided a color film substrate, which includes: a plurality of first color filters; a plurality of second color filters, the plurality of first color filters and the plurality of second color filters being arranged in an array; a plurality of first common electrode sheets, the first color filters being in one-to-one correspondence with the first common electrode sheets; and a plurality of second common electrode sheets, the plurality of first common electrode sheets and the plurality of second common electrode sheets being arranged in an array, and the second color filters being in one-to-one correspondence with the second common electrode sheets, wherein pixels corresponding to the first color filters and the second color filters store pixel voltages having opposite polarities, respectively, the first common electrode sheets transmit a direct-current common voltage, and the second common electrode sheets transmit a square-wave common voltage.

In the color film substrate provided according to an aspect of the present disclosure, alternatively, the direct-current common voltage is a half of an absolute value of a difference between a high level and a low level of a data voltage; phases of the square-wave common voltage and the data voltage are the same, a duration of a high level of the square-wave common voltage is identical with a duration of the high level of the data voltage, and a duration of a low level of the square-wave common voltage is identical with a duration of the low level of the data voltage; and the data voltage is received by the pixels corresponding to the first color filters and the second color filters from data lines.

In the color film substrate provided according to an aspect of the present disclosure, alternatively, the first color filters and the second color filters are alternately arranged in both row and column directions, and color filters vertically and bilaterally adjacent to the first color filters are all the second color filters; or all the first color filters or all the second color filters are arranged in a row direction, and the first color filters and the second color filters are alternately arranged in a column direction; or all the first color filters or all the second color filters are arranged in a column direction, and the first color filters and the second color filters are alternately arranged in a row direction.

In the color film substrate provided according to an aspect of the present disclosure, alternatively, wherein the first common electrode sheets which are located on adjacent two rows connect together, and the second common electrode sheets which are located on adjacent two rows connect together.

According to another aspect of the present disclosure, there is also provided a liquid crystal panel including an array substrate and a color film substrate for cells, wherein the color film substrate is the above color film substrate.

According to yet another aspect of the present disclosure, there is still provided a liquid crystal panel, which includes: a plurality of first pixels, a plurality of second pixels, a plurality of first common electrode lines, a plurality of second common electrode lines, a plurality of scan lines and a plurality of data lines; the scan lines extending along a row direction, and the data lines extending along a column direction, the scan lines and the data lines crossing each other and being insulated, the plurality of first pixels and the plurality of second pixels being arranged in an array, the first pixels and the second pixels being disposed at intersections of respective scan lines and respective data lines, respectively, the first pixels and the second pixels being connected with respective scan lines and respective data lines, respectively, the first pixels being connected with respective first common electrode lines, and the second pixels being connected with respective second common electrode lines; and wherein the first pixel and the second pixel have pixel voltages with opposite polarities, the first common electrode lines transmit a direct-current common voltage, and the second common electrode lines transmit a square-wave common voltage when the liquid crystal panel is driven to display.

In the liquid crystal panel provided according to yet another aspect of the present disclosure, alternatively, when the liquid crystal panel is driven to display a picture of an Nth frame, the first pixels receive a high level of a data voltage provided by the data lines connected with the first pixels, and the pixel voltage of the first pixels is obtained by subtracting the direct-current common voltage from the high level of the data voltage, and the second pixels receive a low level of the data voltage provided by the data lines connected with the second pixels, and the pixel voltage of the second pixels is obtained by subtracting a low level of square-wave common voltage from the low level of the data voltage.

In the liquid crystal panel provided according to yet another aspect of the present disclosure, alternatively, when the liquid crystal panel is driven to display a picture of an N+1th frame, the first pixels receive the low level of the data voltage provided by the data lines connected with the first pixels, and the pixel voltage of the first pixels is obtained by subtracting the direct-current common voltage from the low level of the data voltage, and the second pixels receive the high level of the data voltage provided by the data lines connected with the second pixels, and the pixel voltage of the second pixels is obtained by subtracting a high level of square-wave common voltage from the high level of the data voltage.

In the liquid crystal panel provided according to yet another aspect of the present disclosure, alternatively, the direct-current common voltage is a half of an absolute value of a difference between the high level and the low level of the data voltage; and phases of the square-wave common voltage and the data voltage are the same, a duration of the high level of the square-wave common voltage is identical with a duration of the high level of the data voltage, and a duration of the low level of the square-wave common voltage is identical with a duration of the low level of the data voltage.

In the liquid crystal panel provided according to yet another aspect of the present disclosure, alternatively, the first pixels and the second pixels are alternately arranged in rows and columns of the array, and pixels vertically and bilaterally adjacent to the first pixels are all the second pixels; or all the first pixels or all the second pixels are arranged in rows of the array, and the first pixels and the second pixels are alternately arranged in columns of the array; and or all the first pixels or all the second pixels are arranged in columns of the array; and the first pixels and the second pixels are alternately arranged in rows of the array.

The present disclosure has the following advantageous effect: in driving a display screen of the present disclosure, a charging condition of the pixels in the liquid crystal panel is changed to affect deflection angles of the liquid crystal molecules in the pixels, so that display brightness of adjacent pixels is different, thereby realizing the color shift compensation of large viewing angle display.

BRIEF DESCRIPTION OF THE DRAWINGS

The above and/or other aspects, characteristics and advantages of the embodiments in the invention will become apparent and more readily appreciated from the following description, taken in conjunction with the accompanying drawings in which:

FIG. 3 is a structural diagram of a liquid crystal panel according to an embodiment of the present disclosure; and FIG. 4 is a plane diagram of partial color filters and partial common electrode sheets according to an embodiment of the present disclosure.

DETAILED DESCRIPTION OF EXEMPLARY EMBODIMENTS

Figure 1:
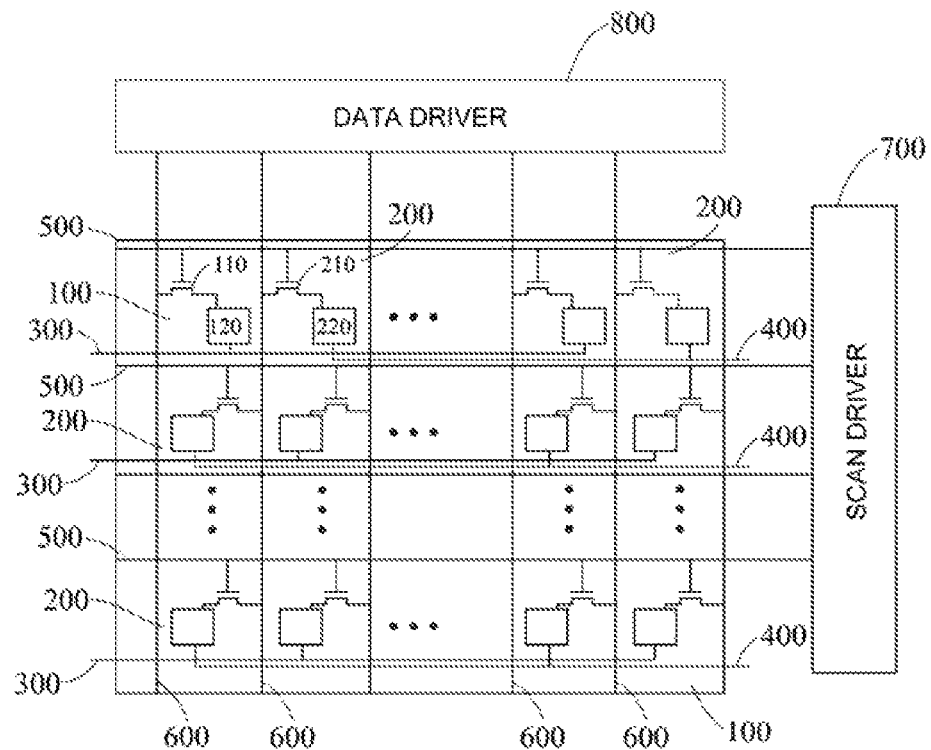
FIG. 1 is an architecture diagram of driving of a liquid crystal panel according to an embodiment of the present disclosure.

Embodiments of the present disclosure will be described in detail below by referring to the accompany drawings. However, the present disclosure can be implemented in numerous different forms, and the present disclosure may not be explained to be limited to the specific embodiments set forth herein. Rather, these embodiments are provided for explaining the principle and actual application of the present invention, thus other skilled in the art can understand various embodiments and amendments which are suitable for specific intended applications of the present invention.

In the drawings, the thicknesses of the layer and the region are exaggerated so as to clarify the component, the same reference sign may indicate the same component in the drawings and the description.

FIG. 1 is an architecture diagram of driving of a liquid crystal panel according to an embodiment of the present disclosure.

Referring to FIG. 1, the liquid crystal panel according to an embodiment of the present disclosure includes a plurality of first pixels 100, a plurality of second pixels 200, a plurality of first common electrode lines 300, a plurality of second common electrode lines 400, a plurality of scan lines 500, a plurality of data lines 600, a scan driver 700 and a data driver 800. It should be explained that the liquid crystal panel according to the embodiment of the present disclosure also includes a timing controller and other necessary components. In addition, it also needs to be explained that the liquid crystal panel according to the embodiment of the present disclosure has a VA display mode, and its pixel structure is designed as a 4-domain pixel structure.

Particularly, each scan line 500 extends along a row direction, and a plurality of scan lines 500 is arranged along a column direction, wherein respective scan lines 500 are parallel with each other. Each data line 600 extends along the column direction, and a plurality of data lines 600 is arranged along the row direction, wherein respective data lines 600 are parallel with each other. In this way, from space, the scan line 500 and the data line 600 cross each other and are electrically insulated to form a plurality of intersections.

Each first pixel 100 is disposed at a corresponding intersection and connects to the corresponding scan line 500 and data line 600. As an embodiment of the present disclosure, the first pixel 100 includes a first thin film transistor 110 and a first liquid crystal cell 120. A gate electrode of the first thin film transistor 110 connects to the corresponding scan line 500, a source electrode of the first thin film transistor 110 connects to the corresponding data line 600, and a drain electrode of the first thin film transistor 110 connects to an end of the first liquid crystal cell 120, and another end of the first liquid crystal cell 120 connects to the corresponding first common electrode line 300. The first liquid crystal cell 120 generally consists of a liquid crystal capacitor (not shown) and a storage capacitor (not shown) which are connected in parallel, but the present disclosure is not limited thereto.

Likewise, each the second pixel 200 is disposed at a corresponding intersection and connects to the corresponding scan line 500 and data line 600. As an embodiment of the present disclosure, the second pixel 200 includes a second thin film transistor 210 and a second liquid crystal cell 220. A gate electrode of the second thin film transistor 210 connects to the corresponding scan line 500, a source electrode of the second thin film transistor 210 connects to the corresponding data line 600, and a drain electrode of the second thin film transistor 210 connects to an end of the second liquid crystal cell 220, and another end of the second liquid crystal cell 220 connects to the corresponding second common electrode line 400. The second liquid crystal cell 220 generally consists of a liquid crystal capacitor (not shown) and a storage capacitor (not shown) which are connected in parallel, but the present disclosure is not limited thereto.

It can be seen from the above that, in the present embodiment, the plurality of first pixels 100 and the plurality of second pixels 200 are arranged in an array, the details are as follows.

In the present embodiment, in the row direction, the first pixel 100 and the second pixel 200 are alternately arranged, in the column direction, the first pixel 100 and the second pixel 200 are alternately arranged, and pixels vertically and bilaterally adjacent to the first pixel 100 are all the second pixels 200. That is to say, the method of pixel array polarity reversion of the liquid crystal panel in the present embodiment is a dot inversion, but the present disclosure is not limited thereto.

As another embodiment of the present disclosure, for example, in the row direction, there are all first pixels 100 or the second pixels 200; and in the column direction, the first pixels 100 or the second pixels 200 are arranged alternately. That is to say, the method of the pixel array polarity reversion of the liquid crystal panel according to another embodiment of the present disclosure is a row inversion, but the present disclosure is not limited thereto.

As yet another embodiment of the present disclosure, for example, in the row direction, the first pixels 100 and the second pixels 200 are arranged alternately; and in the column direction, there are all the first pixels 100 or the second pixel 200. That is to say, the method of the pixel array polarity reversion of the liquid crystal panel according to yet another embodiment of the present disclosure is a column inversion, but the present disclosure is not limited thereto.

Continuing to refer to FIG. 1, in driving display of the liquid crystal panel according to the embodiment of the present disclosure, the polarities of the pixel voltages of the first pixel 100 (or the first liquid crystal cell 120) and the second pixel 200 (or the second liquid crystal cell 220) are opposite, the first common electrode line 300 transmits a direct-current common voltage Vcom1, and the second common electrode line 400 transmits a square-wave common voltage Vcom2.

Figure 2:
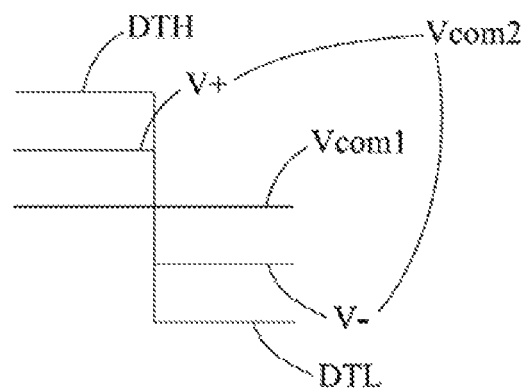
FIG. 2 is a voltage waveform diagram of a data voltage and respective common voltages in driving display of a liquid crystal panel according to an embodiment of the present disclosure.

FIG. 2 is a voltage waveform diagram of a data voltage and respective common voltages in driving display of a liquid crystal panel according to an embodiment of the present disclosure.

Referring to FIGS. 1 and 2 together, when the liquid crystal panel according to the embodiment of the present disclosure is driven to display Nth frame, the scan line 500 receives a gate-on voltage provided by the scan driver 700 to turn on the first thin film transistor 110 and the second thin film transistor 210 connected with the scan line 500, and the data line 600 connected with the first pixel 100 receives a high level DTH of the data voltage provided by the data driver 800, and the high level DTH of the data voltage is provided to the first liquid crystal cell 120 via the first thin film transistor 110 which is turned on; wherein a difference that the high level DTH of the data voltage subtracts the direct-current common voltage Vcom1 transmitted from the first common electrode line 300 is a pixel voltage of the first liquid crystal cell 120; the data line 600 connected with the second pixel 200 receives a low level DTL of the data voltage provided by the data driver 800, and the low level DTL of the data voltage is provided to the second liquid crystal cell 220 via the second thin film transistor 210 which is turned on; wherein a difference that the low level DTL of the data voltage subtracts a low level V− of the square-wave common voltage Vcom2 transmitted from the second common electrode line 400 is a pixel voltage of the second liquid crystal cell 220.

When the liquid crystal panel according to the embodiment of the present disclosure is driven to display N+1th frame, the scan line 500 receives a gate-on voltage provided by the scan driver 700 to turn on the first thin film transistor 110 and the second thin film transistor 210 connected with the scan line 500, and the data line 600 connected with the first pixel 100 receives the low level DTL of the data voltage provided by the data driver 800, and the low level DTL of the data voltage is provided to the first liquid crystal cell 120 via the first thin film transistor 110 which is turned on; wherein a difference that the low level DTL of the data voltage subtracts the direct-current common voltage Vcom1 transmitted from the first common electrode line 300 is the pixel voltage of the first liquid crystal cell 120; the data line 600 connected with the first pixel 200 receives the high level DTH of the data voltage provided by the data driver 800, and the high level DTH of the data voltage is provided to the second liquid crystal cell 220 via the second thin film transistor 210 which is turned on; wherein a difference that the high level DTH of the data voltage subtracts a high level V+ of the square-wave common voltage Vcom2 transmitted from the second common electrode line 400 is the pixel voltage of the second liquid crystal cell 220.

Accordingly, when the liquid crystal panel according to the embodiment of the present disclosure is driven to display an image, a charging condition of the pixels in the liquid crystal panel is changed to affect deflection angles of the liquid crystal molecules in the pixels, so that display brightness of adjacent pixels is different, thereby realizing the color shift compensation of large viewing angle display.

In addition, it needs to be explained that in the present embodiment, the direct-current common voltage Vcom1 is a half of an absolute value of a difference between the high level DTH and the low level DTL of the data voltage; phases of the square-wave common voltage Vcom2 and the data voltage are the same, a duration of the high level V+ of the square-wave common voltage Vcom2 is identical with a duration of the high level DTH of the data voltage, and a duration of the low level V− of the square-wave common voltage Vcom2 is identical with a duration of the low level DTL of the data voltage.

Figures 3, 4:
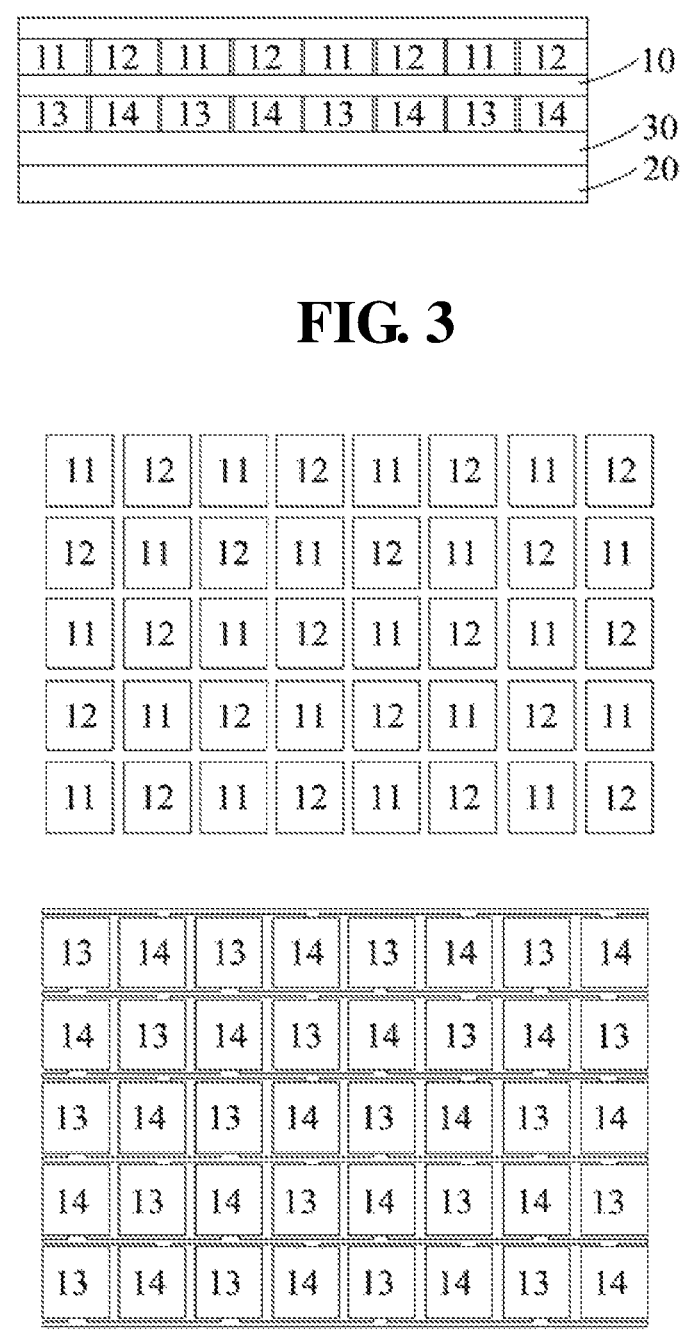

FIG. 3 is a structural diagram of a liquid crystal panel according to an embodiment of the present disclosure. FIG. 4 is a plane diagram of partial color filters and partial common electrode sheets according to an embodiment of the present disclosure.

Referring to FIGS. 3 and 4, the liquid crystal display according to an embodiment of the present disclosure includes a color film substrate (or called color filter substrate) 10 and an array substrate (or called thin film transistor substrate) 20 for cells and a liquid crystal layer 30 interposed therebetween.

The array substrate 20 includes a plurality of first thin film transistors 110, a plurality of second thin film transistors 220, a plurality of scan lines 500, a plurality of data lines 600, a scan driver 700, a data driver 800 etc. thereon, as shown in FIG. 1, but these components are not shown in FIG. 3. The liquid crystal layer 30 has a plurality of first liquid crystal cells 120 and a plurality of second liquid crystal cells 220, but the first liquid crystal cell 120 and the plurality of liquid crystal cell 220 are not shown in FIG. 3. The first thin film transistor 110 and the first liquid crystal cell 120 are connected and constitute the first pixel 100, and the second thin film transistor 210 and the second liquid crystal cell 220 are connected and constitute the second pixel 200.

A detailed description on the color film substrate 10 according to the embodiment of the present disclosure will be provided below.

The color film substrate 10 includes a plurality of first color filters 11, a plurality of second color filters 12, a plurality of first common electrode sheets 13 and a plurality of second common electrode sheets 14. Here, the first color filter 11 corresponds to the first pixel 100, the second color filter 12 corresponds to the second pixel 200, the first common electrode sheet 13 corresponds to the first common electrode line 300, and the second common electrode sheet 14 corresponds to the second common electrode line 400.

The first color filter 11 may be, for example, one of a red color filter, a green color filter and a blue color filter, and the second color filter 12 may also be, for example, one of a red color filter, a green color filter and a blue color filter, but the present disclosure is not limited thereto.

The plurality of first color filters 11 and the plurality of second color filters 12 are arranged in an array, and the plurality of first common electrode sheets 13 and the plurality of second common electrode sheets 14 are arranged in an array. The first color filter 11 is in one-to-one correspondence with the first common electrode sheet 13, and the second color filter 12 is in one-to-one correspondence with the second common electrode sheet 14. The polarities of the pixel voltage of the first pixel 100 corresponding to the first color sheet 11 and the pixel voltage of the second pixel 200 corresponding to the second color sheet 12 are opposite in driving display. The first common electrode sheet 13 serves to transmit the direct-current common voltage Vcom1, and the second common electrode sheet 14 serves to transmit the square-wave common voltage Vcom2.

Furthermore, in the row direction, the first color filter 11 and the second color filter 12 are arranged alternately, and in the column direction, the first color filter 11 and the second color filter 12 are arranged alternately, and color filters vertically and bilaterally adjacent to the first color filter 11 are all the second color filters 12, but the present disclosure is not limited thereto.

For example, as another embodiment of the present disclosure, in the row direction, there are all the first color filters 11 or the second color filters 12, and in the column direction, the first color filter 11 and the second color filters 12 are arranged alternately.

Or, for example, as yet another embodiment of the present disclosure, in the column direction, there are all the first color filters 11 or the second color filters 12, and in the row direction, the first color filters 11 and the second color filters 12 are arranged alternately.

Furthermore, in the embodiment of the present disclosure, except the second common electrode sheets 14 located in the first row and the first common electrode sheets 13 located in the last row, the first common electrode sheets 13 in any adjacent two rows connect together, and the second common electrode sheets 14 in any adjacent two rows connect together.

To sum up, according to the embodiment of the present disclosure, in driving to display a screen, a charging condition of the pixels in the liquid crystal panel is changed to affect deflection angles of the liquid crystal molecules in the pixels, so that display brightness of adjacent pixels is different, thereby realizing the color shift compensation of large viewing angle display.

Although the present invention is shown and described with reference to the special exemplary embodiment, while those skilled in the art will understand: various changes in form and details may be made therein without departing from the spirit and scope of the invention as defined by the appended claims and its equivalents.

What is claimed is:

1. A color film substrate, comprising:
   a plurality of first color filters;
   a plurality of second color filters, the plurality of first color filters and the plurality of second color filters being arranged in an array;
   a plurality of first common electrode sheets, the first color filters being in one-to-one correspondence with the first common electrode sheets; and
   a plurality of second common electrode sheets, the plurality of first common electrode sheets and the plurality of second common electrode sheets being arranged in an array, and the second color filters being in one-to-one correspondence with the second common electrode sheets,
   wherein pixels corresponding to the first color filters and the second color filters store pixel voltages having opposite polarities, respectively, the first common electrode sheets transmit a direct-current common voltage, and the second common electrode sheets transmit a square-wave common voltage.

2. The color film substrate of claim 1, wherein the direct-current common voltage is a half of an absolute value of a difference between a high level and a low level of a data voltage; phases of the square-wave common voltage and the data voltage are the same, a duration of a high level of the square-wave common voltage is identical with a duration of the high level of the data voltage, and a duration of a low level of the square-wave common voltage is identical with a duration of the low level of the data voltage; and the data voltage is received by the pixels corresponding to the first color filters and the second color filters from data lines.

3. The color film substrate of claim 1, wherein the first color filters and the second color filters are alternately arranged in both row and column directions, and color filters vertically and bilaterally adjacent to the first color filters are all the second color filters;

or all the first color filters or all the second color filters are arranged in a row direction, and the first color filters and the second color filters are alternately arranged in a column direction;

or all the first color filters or all the second color filters are arranged in a column direction, and the first color filters and the second color filters are alternately arranged in a row direction.

4. The color film substrate of claim 2, wherein the first color filters and the second color filters are alternately arranged in both row and column directions, and color filters vertically and bilaterally adjacent to the first color filters are all the second color filters;

or all the first color filters or all the second color filters are arranged in a row direction, and the first color filters and the second color filters are alternately arranged in a column direction;

or all the first color filters or all the second color filters are arranged in a column direction, and the first color filters and the second color filters are alternately arranged in a row direction.

5. The color film substrate of claim 1, wherein the first common electrode sheets which are located on adjacent two rows connect together, and the second common electrode sheets which are located on adjacent two rows connect together.

6. The color film substrate of claim 2, wherein the first common electrode sheets which are located on adjacent two rows connect together, and the second common electrode sheets which are located on adjacent two rows connect together.

7. A liquid crystal panel, comprising an array substrate and a color film substrate for cells, wherein the color film substrate is the color film substrate of claim 1.

8. A liquid crystal panel, comprising: a plurality of first pixels, a plurality of second pixels, a plurality of first common electrode lines, a plurality of second common electrode lines, a plurality of scan lines and a plurality of data lines;

the scan lines extending along a row direction, and the data lines extending along a column direction, the scan lines and the data lines crossing each other and being insulated, the plurality of first pixels and the plurality of second pixels being arranged in an array, the first pixels and the second pixels being disposed at intersections of respective scan lines and respective data lines, respectively, the first pixels and the second pixels being connected with respective scan lines and respective data lines, respectively, the first pixels being connected with respective first common electrode lines, and the second pixels being connected with respective second common electrode lines; and wherein the first pixel and the second pixel have pixel voltages with opposite polarities, the first common electrode lines transmit a direct-current common voltage, and the second common electrode lines transmit a square-wave common voltage when the liquid crystal panel is driven to display.

9. The liquid crystal panel of claim 8, wherein when the liquid crystal panel is driven to display a picture of an Nth frame, the first pixels receive a high level of a data voltage provided by the data lines connected with the first pixels, and the pixel voltage of the first pixels is obtained by subtracting the direct-current common voltage from the high level of the data voltage, and the second pixels receive a low level of the data voltage provided by the data lines connected with the second pixels, and the pixel voltage of the second pixels is obtained by subtracting a low level of square-wave common voltage from the low level of the data voltage.

10. The liquid crystal panel of claim 9, wherein when the liquid crystal panel is driven to display a picture of an N+1th frame, the first pixels receive the low level of the data voltage provided by the data lines connected with the first pixels, and the pixel voltage of the first pixels is obtained by subtracting the direct-current common voltage from the low level of the data voltage, and the second pixels receive the high level of the data voltage provided by the data lines connected with the second pixels, and the pixel voltage of the second pixels is obtained by subtracting a high level of square-wave common voltage from the high level of the data voltage.

11. The liquid crystal panel of claim 9, wherein the direct-current common voltage is a half of an absolute value of a difference between the high level and the low level of the data voltage; and phases of the square-wave common voltage and the data voltage are the same, a duration of the high level of the square-wave common voltage is identical with a duration of the high level of the data voltage, and a duration of the low level of the square-wave common voltage is identical with a duration of the low level of the data voltage.

12. The liquid crystal panel of claim 10, wherein the direct-current common voltage is a half of an absolute value of a difference between the high level and the low level of the data voltage; and phases of the square-wave common voltage and the data voltage are the same, a duration of the high level of the square-wave common voltage is identical with a duration of the high level of the data voltage, and a duration of the low level of the square-wave common voltage is identical with a duration of the low level of the data voltage.

13. The liquid crystal panel of claim 8, wherein the first pixels and the second pixels are alternately arranged in rows and columns of the array, and pixels vertically and bilaterally adjacent to the first pixels are all the second pixels;

or all the first pixels or all the second pixels are arranged in rows of the array, and the first pixels and the second pixels are alternately arranged in columns of the array; and or all the first pixels or all the second pixels are arranged in columns of the array; and the first pixels and the second pixels are alternately arranged in rows of the array.

* * * * *